(12) United States Patent
Enomoto

(10) Patent No.: US 9,302,698 B2
(45) Date of Patent: Apr. 5, 2016

(54) STEERING APPARATUS

(71) Applicant: Showa Corporation, Gyoda-shi (JP)

(72) Inventor: Satoshi Enomoto, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/551,630

(22) Filed: Nov. 24, 2014

(65) Prior Publication Data

US 2015/0274192 A1 Oct. 1, 2015

(30) Foreign Application Priority Data

Mar. 26, 2014 (JP) ................................. 2014-063182

(51) Int. Cl.
*B62D 3/12* (2006.01)
*B62D 7/22* (2006.01)
*F16F 1/376* (2006.01)
*F16F 1/44* (2006.01)

(52) U.S. Cl.
CPC *B62D 3/126* (2013.01); *B62D 3/12* (2013.01); *B62D 7/226* (2013.01); *F16F 1/376* (2013.01); *F16F 1/44* (2013.01)

(58) Field of Classification Search
CPC .......... B62D 3/126; B62D 7/226; B62D 3/12; F16F 1/376; F16F 1/44
USPC .................................................... 280/93.514
See application file for complete search history.

(56) References Cited

U.S. PATENT DOCUMENTS

| 8,925,939 B2 * | 1/2015 | Ohashi ..................... 280/93.514 |
| 2015/0027248 A1 * | 1/2015 | Yamada et al. .............. 74/89.14 |
| 2015/0158520 A1 * | 6/2015 | Watanabe ................ 280/93.514 |

FOREIGN PATENT DOCUMENTS

| EP | 2733048 A | 5/2014 |
| JP | 06-069061 U | 9/1994 |

OTHER PUBLICATIONS

U.K. Search Report mailed May 14, 2015, for the corresponding U.K. Application No. 1420808.6.

* cited by examiner

*Primary Examiner* — Faye M Fleming
(74) *Attorney, Agent, or Firm* — Leason Ellis LLP

(57) ABSTRACT

A steering apparatus includes a rack shaft moving in a vehicle width direction for steering steered wheels, a rack end in a moving side, which is provided in the rack shaft and integrally moving with the rack shaft, a housing body in a fixed side, which does not move in the vehicle width direction and controls the movement of the rack shaft by collision from the rack end to the housing body and a shock absorbing member provided between the rack end and the housing body to absorb a shock from the rack end to the housing body, in which the shock absorbing member includes a low-spring rate portion and a high-spring rate portion having a higher spring rate than that of the low-spring rate portion in the vehicle width direction.

7 Claims, 9 Drawing Sheets

< COLLISION STATE WITH RESPECT TO LOW-SPRING RATE PORTION >

< COLLISION STATE WITH RESPECT TO HIGH-SPRING RATE PORTION >

STEERING APPARATUS

CROSS-REFERENCE TO RELATED APPLICATIONS

This application is based on and claims priority under 35 USC 119 from Japanese Patent Application No. 2014-063182 filed on Mar. 26, 2014, the entire content of which is incorporated herein by reference.

BACKGROUND OF THE INVENTION

1. Technical Field

The present invention relates to a steering apparatus.

2. Related Art

In a rack-and-pinion steering apparatus, there is proposed a technique in which an elastic body is interposed between a rack end and a housing, and the elastic body is elastically deformed in order to absorb a shock between the rack end (first stopper) fixed to the rack shaft (steered shaft) and the housing (second stopper) which houses the rack shaft (refer to Patent Literature 1 (JP-UM-A-6-69061).

SUMMARY OF THE INVENTION

However, in the case where the elastic body is elastically deformed and reaches a normal steering limit, when a further shock (load) is inputted from a steered wheel to the steered shaft, because, for example, the steered wheel is caught in ruts or runs on a curb, the shock may be directly inputted to rack tooth and pinion tooth.

In view of the above, an object of the present invention is to provide a steering apparatus capable of absorbing a shock in good condition.

According to an embodiment of the present invention, there is provided a steering apparatus including a steered shaft moving in a vehicle width direction for steering vehicle wheels, a first stopper in a moving side, which is provided in the steered shaft and integrally moving with the steered shaft, a second stopper in a fixed side, which does not move in the vehicle width direction and controls the movement of the steered shaft by collision from the first stopper to the second stopper, and a shock absorbing member provided between the first stopper and the second stopper to absorb a shock from the first stopper to the second stopper, in which the shock absorbing member includes a low-spring rate portion and a high-spring rate portion having a higher spring rate than the low-spring rate portion in the vehicle width direction.

Here, a spring rate is a force necessary for compressing the shock absorbing member (elastic body) by a unit length (1 mm, 1 cm or the like) in the vehicle width direction (a collision direction of the first stopper and the second stopper). Accordingly, a force necessary for compressing the low-spring rate portion by the unit length is smaller than a force necessary for compressing the high-spring rate portion by the unit length. Therefore, the low-spring rate portion and the high-spring rate portion are generally compressed in this order.

According to the structure, for example, in the case where the steered shaft moves by a driver performing steering operation and the shock absorbing member is sandwiched between the first stopper and the second stopper in the vehicle width direction, the low-spring rate portion is chiefly deformed when a shock (load) inputted to the shock absorbing member is small. Then, the low-spring rate portion absorbs and damps the shock.

When a further larger shock is inputted from the steered wheel to the steered shaft, because, for example, the steered wheel is caught by ruts and other reasons in the case where the low-spring rate portion is deformed, the high-spring rate portion is deformed in addition to the low-spring rate control portion. Then, the high-spring rate portion absorbs and damps the shock.

As described above, the low-spring rate portion and the high-spring rate portion are deformed, thereby absorbing and damping small and large shocks. Accordingly, the large shock does not directly act on rack tooth and so on, and tooth surfaces are not distorted.

The steering apparatus may have a structure in which the low-spring rate portion and the high-spring rate portion are made of the same material, and a first pressure receiving area of the low-spring rate portion receiving the shock from the first stopper to the second stopper is smaller than a second pressure receiving area of the high-spring rate portion receiving the shock therefrom.

According to the structure, the low-spring rate portion and the high-spring rate portion can be formed by changing the pressure receiving area receiving the shock of the stopper.

The steering apparatus may have a structure in which the low-spring rate portion is made of a low-elasticity material having a low elasticity and the high-spring rate portion is made of a high-elasticity material having a higher elasticity than the low-elasticity material.

According to the structure, the low-spring rate portion can be made of the low-elasticity material and the high-spring rate portion can be made of the high-elasticity material.

According to the present invention, it is possible to provide the steering apparatus absorbing the shock in good condition.

DETAILED DESCRIPTION OF THE INVENTION

Figure 1:
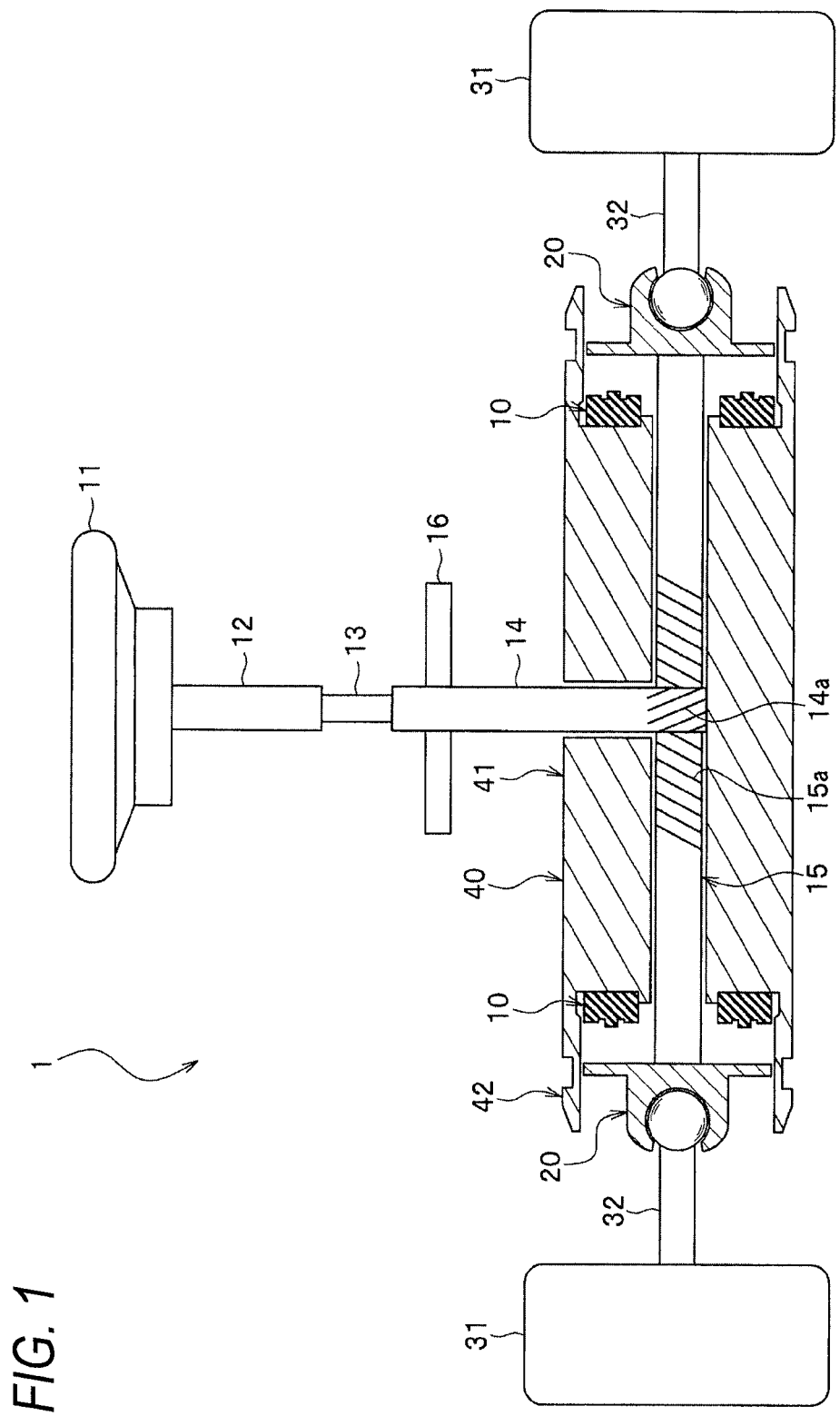
FIG. 1 is a structure view showing a steering apparatus according to an embodiment.

An embodiment of the present invention will be explained with reference to FIG. 1 to FIG. 7.

In the following explanation, an axis direction indicates an axis direction of a rack shaft 15 (steered shaft) having a round-bar shape, and a radial direction indicates a radial direction of the rack shaft 15. The axis direction is the same direction as a vehicle width direction. An outer side in the vehicle width direction indicates the side close to the vehicle outside in the vehicle width direction (right and left direction), and an inner side in the vehicle width direction indicates the side close to the vehicle center in the vehicle width direction.

<Structure of Steering Apparatus>

A steering apparatus 1 is a rack-and-pinion type motor-driven power steering apparatus, which is a pinion-assist type apparatus in which an assisting force generated by an electric motor is inputted into a pinion shaft 14. However, a column-assist type apparatus and a rack-assist type apparatus can be also applied. It is also preferable to apply a hydraulic power steering apparatus which generates the assisting force by a hydraulic motor.

The steering apparatus 1 includes a steering wheel 11 operated by a driver, a steering shaft 12 integrally rotating with the steering wheel 11, a torsion bar 13 connected to a lower end of the steering shaft 12, a pinion shaft 14 connected to a lower end of the torsion bar 13 and a rack shaft (steered shaft) 15 extending in the vehicle width direction. Pinion tooth 14a of the pinion shaft 14 is engaged with rack tooth 15a of the rack shaft 15. Then, when the pinion shaft 14 is rotated, the rack shaft 15 moves in the vehicle width direction.

A worm wheel 16 is co-axially fixed to the pinion shaft 14. Then, the assisting force is inputted from the electric motor (not shown) to the worm wheel 16 (pinion shaft 14) in accordance with a torsion torque generated in the torsion bar 13.

The steering apparatus 1 includes rack ends 20 (first stoppers) fixed to respective ends of the rack shaft 15, tie rods 32 connecting between the rack ends 20 and steered wheels 31, a tubular housing 40 housing the rack shaft 15 and shock absorbing members 50 fixed to the housing 40. When the rack shaft 15 moves in the vehicle width direction, the steered wheels 31 are turned.

(Rack Shaft)

The rack shaft 15 is a round-bar part moving in the vehicle width direction for steering the steered wheels 31 around an axis line O1. The rack shaft 15 is housed in the housing 40 so as to be slide freely through a bush (not shown).

(Rack End)

The rack ends 20 are stopper members respectively fixed to both end portions of the rack shaft 15. The rack ends 20 are fixed by, for example, being screwed with the rack shaft 15.

Figure 2:
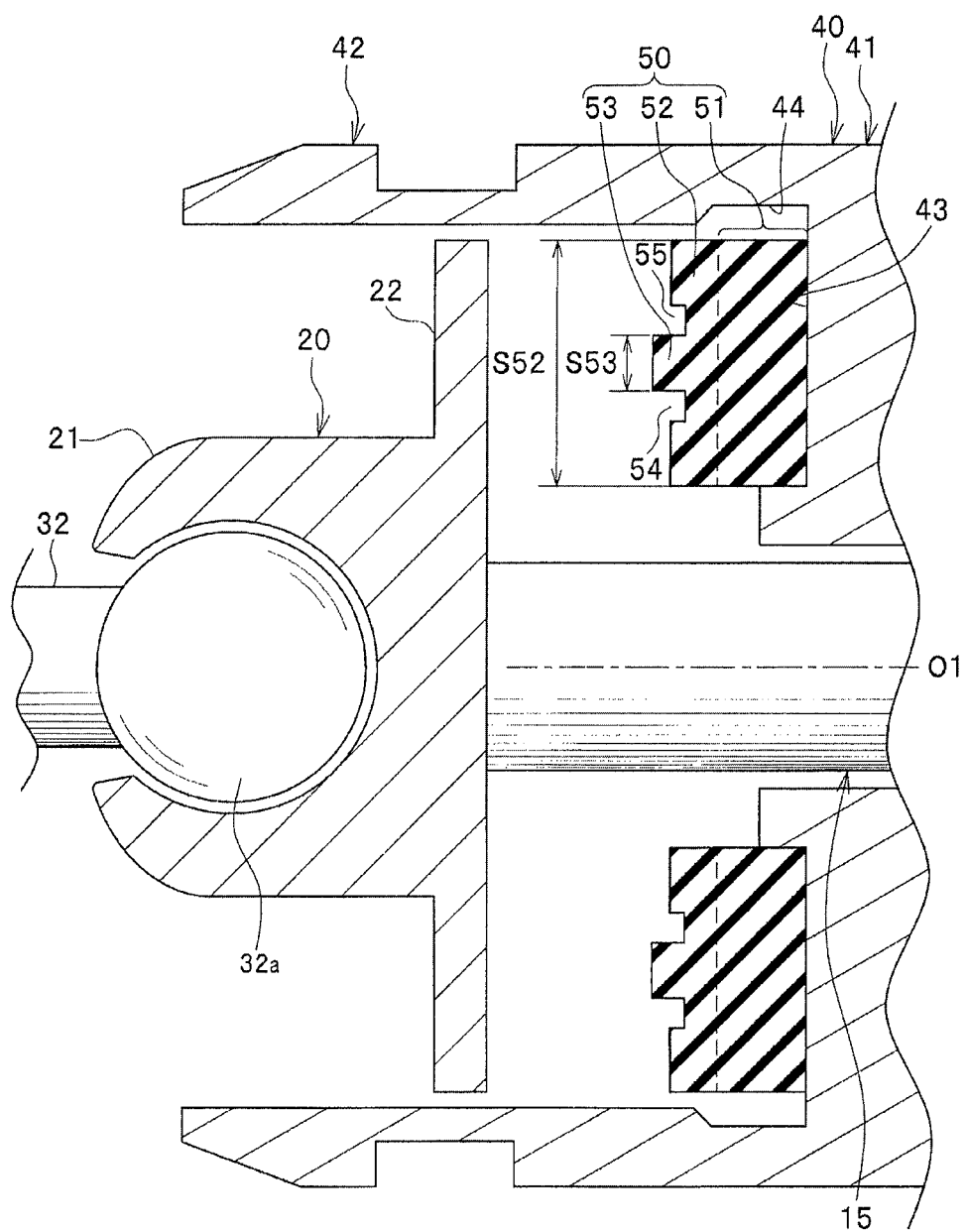
FIG. 2 is an enlarged view of a relevant part of the steering apparatus according to the embodiment, showing a neutral state (uncompressed state of a shock absorbing member)

Each rack end 20 includes a rack end body 21 having a bottomed cylindrical shape in which the inner side thereof in the vehicle width direction is closed and a ring-shaped stopper portion 22 formed with a large diameter in the inner side of the rack end body 21 in the vehicle width direction as shown in FIG. 2.

An inner surface of the rack end body 21 is a spherical surface, and the rack end body 21 houses a spherical head 32a of the tie rod 32 so as to swing freely. That is, the rack end body 21 and the tie rod 32 form a ball joint.

The stopper portion 22 collides with the later-described shock absorbing member 50, thereby controlling movement to the inside of the rack shaft 15 in the vehicle width direction and prescribing the steering limit. A collision surface which collides with the shock absorbing member 50 is formed in the inner side of the stopper portion 22 in the vehicle width direction.

(Housing)

The housing 40 is a tubular body extending in the vehicle width direction, which houses the rack shaft 15 inside. The housing 40 is fixed to the vehicle body by a not-shown bolt and so on.

The housing 40 includes a housing body 41 (second stopper) which is a thick tubular body and a rack-end housing portion 42 which is a thin tubular body extending from each end of the housing body 41 toward the outer side in the vehicle width direction. That is, an inner diameter of the rack-end housing portion 42 is larger than an inner diameter of the housing body 41. The rack end 20 is housed inside the rack-end housing portion 42.

An annular housing groove 43 to which the shock absorbing member 50 is attached is formed in the outer side of the housing body 41 in the vehicle width direction. That is, the housing 41 functions as a fixing-side stopper not moving in the vehicle width direction and controlling the movement of the rack shaft 15 by the collision from the rack ends 20 to the housing 41. A depth of the housing grooves 43 is approximately ⅓ of a thickness (length in the axis direction) of the later-described shock absorbing member 50.

A diameter of a groove side surface in the outer side of the housing groove 43 in the radial direction is slightly increased to form a clearance portion 44. Accordingly, when the shock absorbing member 50 is deformed, part of the shock absorbing member 50 escapes to the clearance 44 to thereby facilitate the compression of the shock absorbing member 50 in the axis direction.

(Shock Absorbing Member)

The shock absorbing member 50 is provided between the rack end 20 and the housing body 41, which is a member controlling the movement of the rack shaft 15 by the collision of the rack end 20 and absorbing a shock from the rack end 20 to the housing body 41. The shock absorbing member 50 is a member integrally formed by one kind of elastic material (rubber and so on), having an annular shape (see FIG. 3).

The shock absorbing member 50 includes a pedestal portion 51 having a thickness of approximately ½ of the whole thickness, a high-spring rate portion 52 and a low-spring rate portion 53 from the inner side toward the outer side (rack end 20 side) in the vehicle width direction. That is, the shock absorbing member 50 has the high-spring rate portion 52 and the low-spring rate portion 53 in series in the vehicle width direction (collision direction of the rack end 20).

(Shock Absorbing Member-Pedestal Portion)

The pedestal portion 51 has an extremely thick ring shape (see FIG. 3), which is fixed to the housing groove 43 by an adhesive and so on. An inside portion of approximately ½ of the pedestal portion 51 in the vehicle width direction is housed in the housing groove 43, and an outside portion of approximately ½ of the pedestal portion 51 in the vehicle direction protrudes from the housing groove 43 toward the outer side in the vehicle width direction.

(Shock Absorbing Member-High-Spring Rate Portion)

Figure 3:
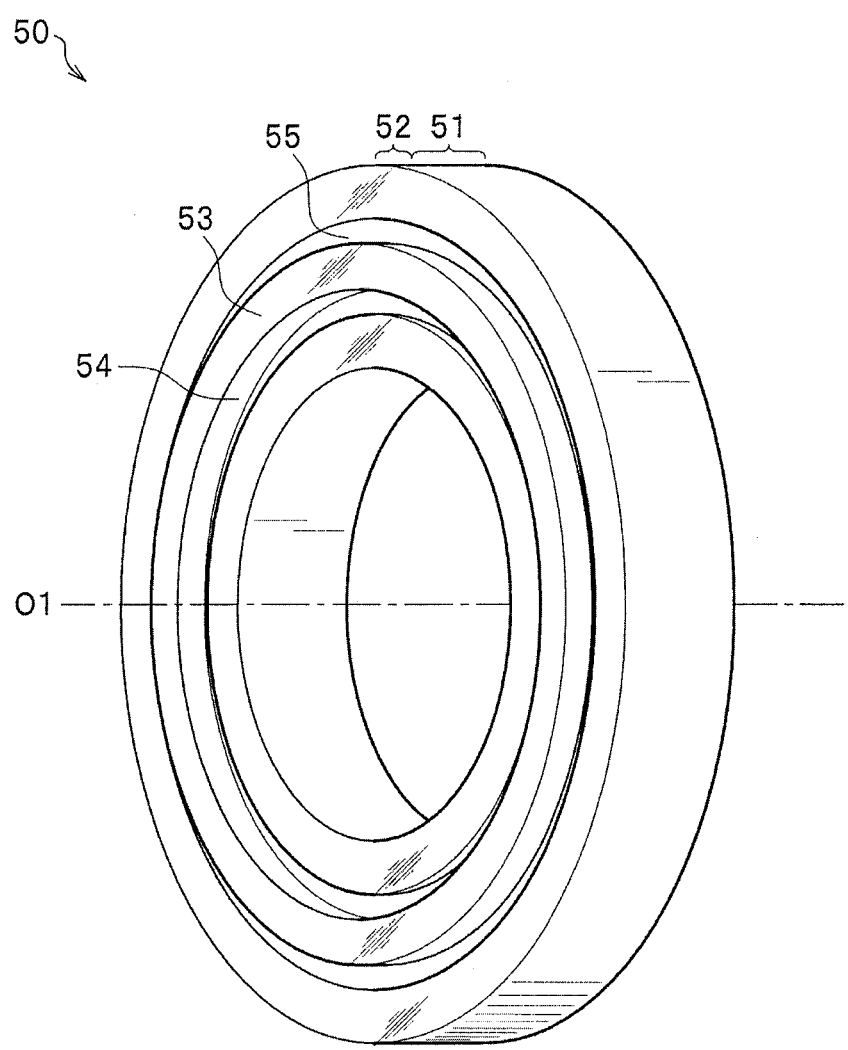
FIG. 3 is a perspective view showing the shock absorbing member according to the embodiment.
Figure 4:
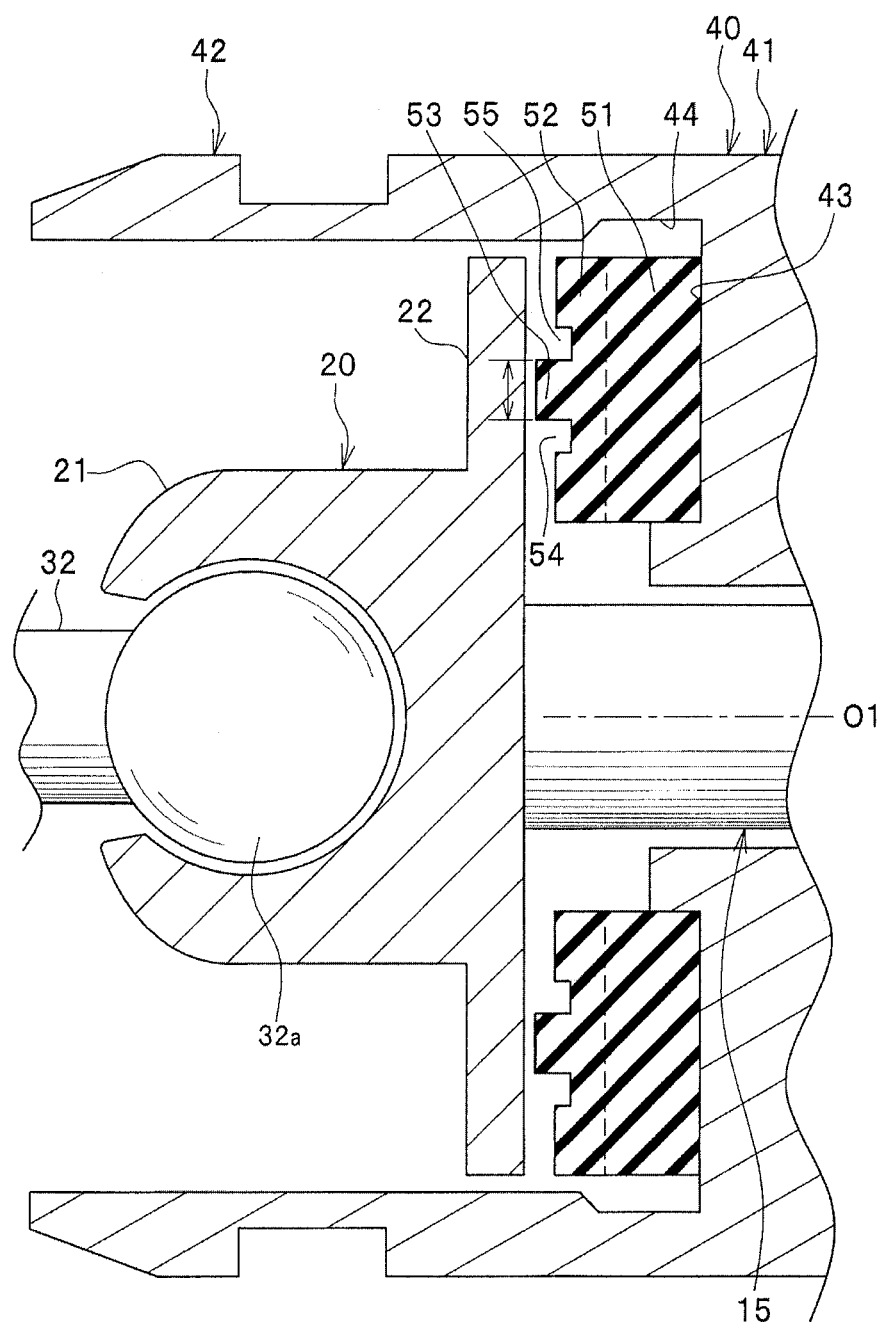
FIG. 4 is an enlarged view of a relevant part of the steering apparatus according to the embodiment, showing a collision state with respect to a low-spring rate portion.
Figure 5:
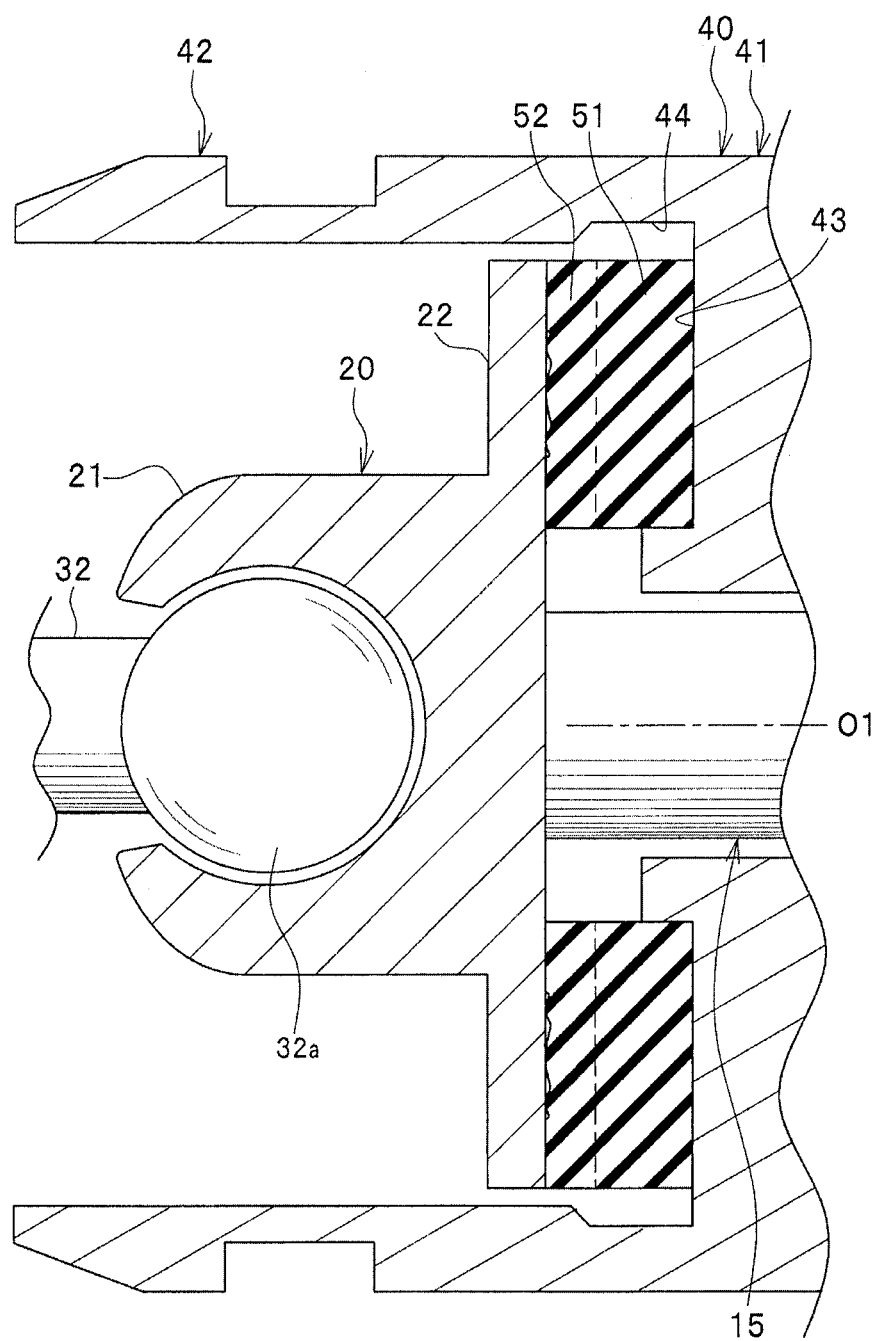
FIG. 5 is an enlarged view of a relevant part of the steering apparatus according to the embodiment, showing a collision state with respect to a high-spring rate portion after compression of the low-spring rate portion.
Figure 6:
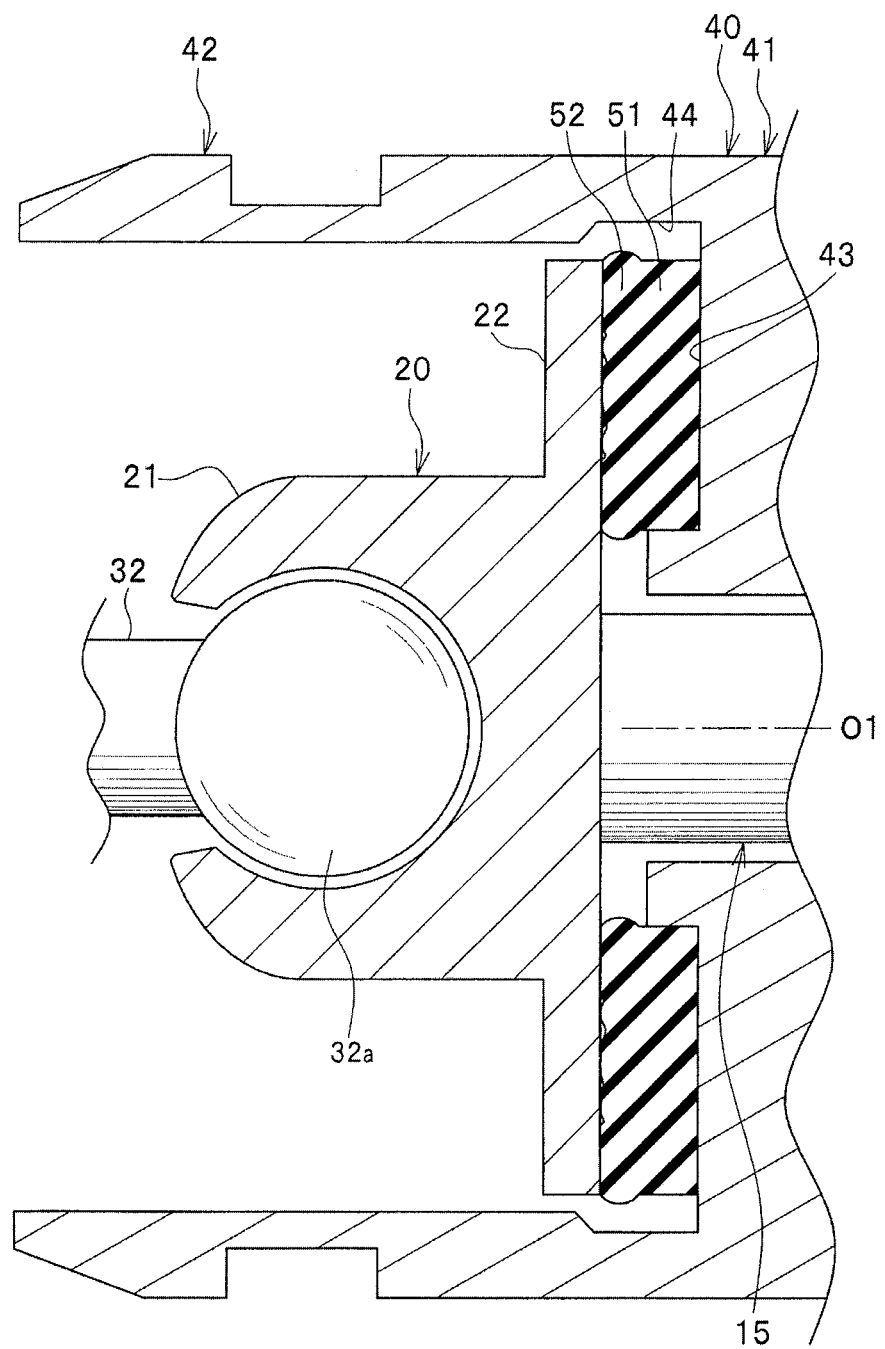
FIG. 6 is an enlarged view of a relevant part of the steering apparatus according to the embodiment, showing a compression state of the low-spring rate portion and the high-spring rate portion.
Figure 7:
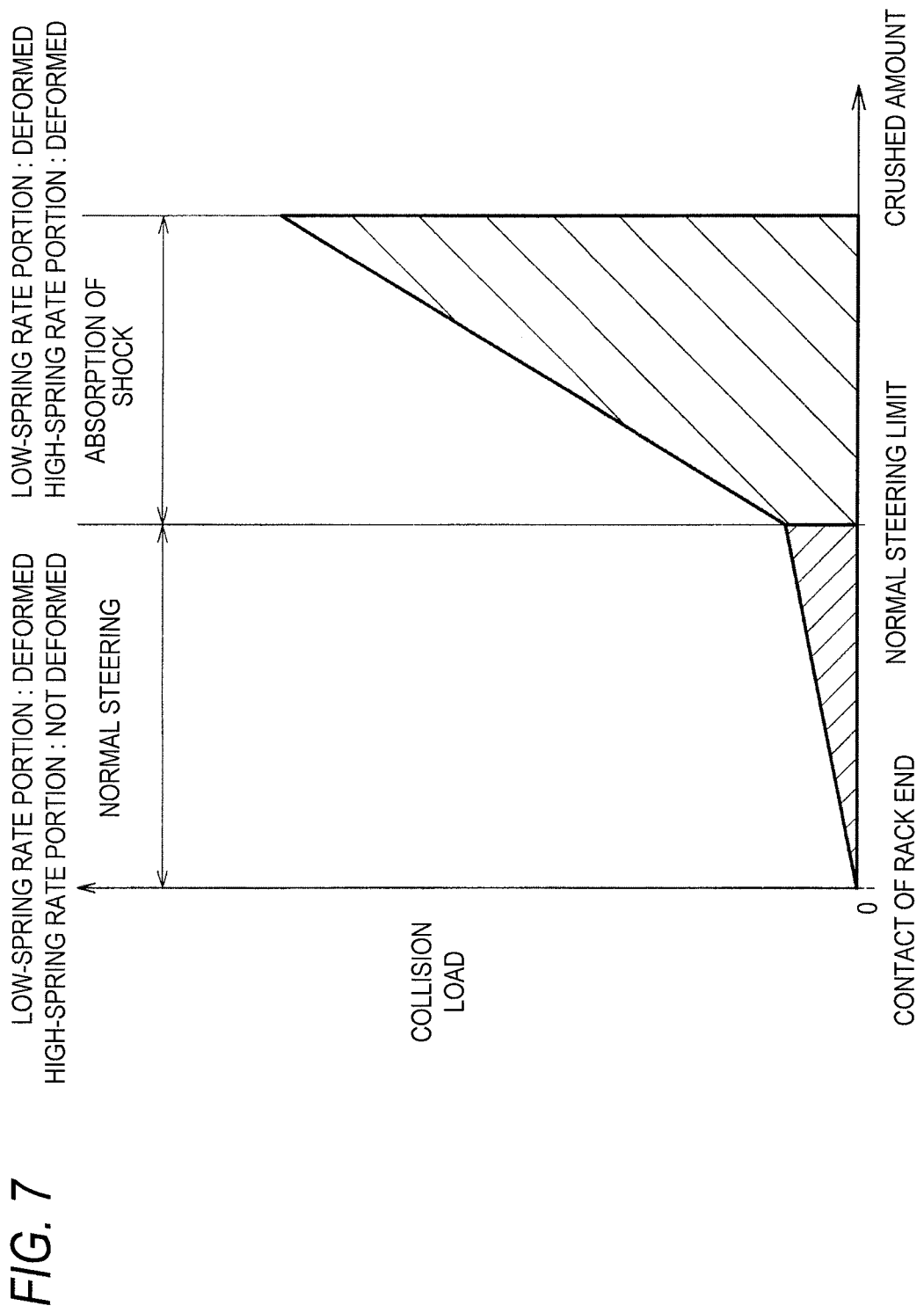
FIG. 7 is a graph showing operation and effect of the steering apparatus according to the embodiment.

The high-spring rate portion 52 has a thin-walled ring shape formed in the outer side of the pedestal portion 51 in the vehicle width direction (see FIG. 3). Here, a contact area between the high-spring rate portion 52 and the stopper portion 22, namely, a pressure receiving area of the high-spring rate portion 52 receiving the shock of the rack end 20 is denoted by a second pressure receiving area S52.

A first groove 54 having a semicircular shape in cross section is formed in an outer side surface of the high-spring rate portion 52 in the vehicle width direction, namely, in the inner side of the low-spring rate portion 53 in the radial direction, and a second groove 55 having a semicircular shape in cross section is formed in the outer side of the low-spring rate portion 53 in the radial direction. The first groove 54 and the second groove 55 are spaces for allowing the low-spring rate portion 53 which is compressed and deformed to escape.
(Shock Absorbing Member-Low-Spring Rate Portion)

The low-spring rate portion 53 is a ring-shaped portion with a narrow width protruding from an intermediate part of the high-spring rate portion 52 in the radial direction toward the rack end 20. That is, the width of the low-spring rate portion 53 in the radial direction is smaller than the width of the high-spring rate portion 52 in the radial direction. Here, a contact area between the low-spring rate portion 53 and the stopper portion 22, namely, a pressure receiving area of the low-spring rate portion 53 receiving the shock of the rack end 20 is denoted by a first pressure receiving area S53.
(Size of Pressure Receiving Areas)

The first pressure receiving area S53 of the low-spring rate portion 53 is smaller than the second pressure receiving area S52 of the high-spring rate portion 52 (S53<S52). Accordingly, a spring rate of the low-spring rate portion 53 is smaller than a spring rate of the high-spring rate portion 52 though the low-spring rate portion 53 and the high-spring rate portion 52 are made of the same material as described above.

Accordingly, the low-spring rate portion 53 is configured to be preferentially compressed and deformed rather than the high-spring rate portion 52. Therefore, in general, when a shock load is small, the low-spring rate portion 53 is deformed, and when the shock load is large, the low-spring rate portion 53 and the high-spring rate portion 54 are deformed.

<Operation and Effect of Steering Apparatus>

Operation and effect of the steering apparatus 1 will be explained.
(Collision Load: Normal)

When the steering wheel 11 is operated, the rack shaft 15 is moved. Then, after the rack end 20 collides with the low-spring rate portion 53 (see FIG. 4), the low-spring rate portion 53 is compressed and deformed. As the low-spring rate portion 53 is deformed in this manner, a shock (collision load) inputted from the rack end 20 to the shock absorbing member 50 is absorbed and damped (see FIG. 7). Then, when a crushed amount of the shock absorbing member 50 (deformation amount of the low-spring rate portion 53) is increased, the low-spring rate portion 53 almost reaches the compression limit and the rack end 20 collides with the high-spring rate portion 52, the apparatus reaches the steering limit in the normal state (see FIG. 5).
(Collision Load: Large)

In the case where the apparatus reaches the steering limit as described above, when a force toward the inside in the vehicle width direction is inputted to the rack end 20 because, for example, the steered wheel 31 is caught by ruts, the shock (load) inputted from the rack end 20 to the shock absorbing member 50 is increased. In such case, the high-spring rate portion 52 is compressed and deformed in addition to the compressed and deformed low-spring rate potion 53 (see FIG. 6). As the high-spring rate portion 52 is deformed as described above, the shock is absorbed and damped (see FIG. 7).
(Summary)

As the shock absorbing member 50 is deformed as described above, large and small collision loads inputted from the rack end 20 can be absorbed. Accordingly, the collision load does not act on the rack tooth 15a and the pinion tooth 14a without being absorbed. Accordingly, tooth surfaces of the rack tooth 15a and the pinion tooth 14a are protected from damage and so on.

MODIFICATION EXAMPLE

Though the embodiment of the present invention has been explained as the above, the present invention is not limited to this and can be modified as described below.

Figure 8:
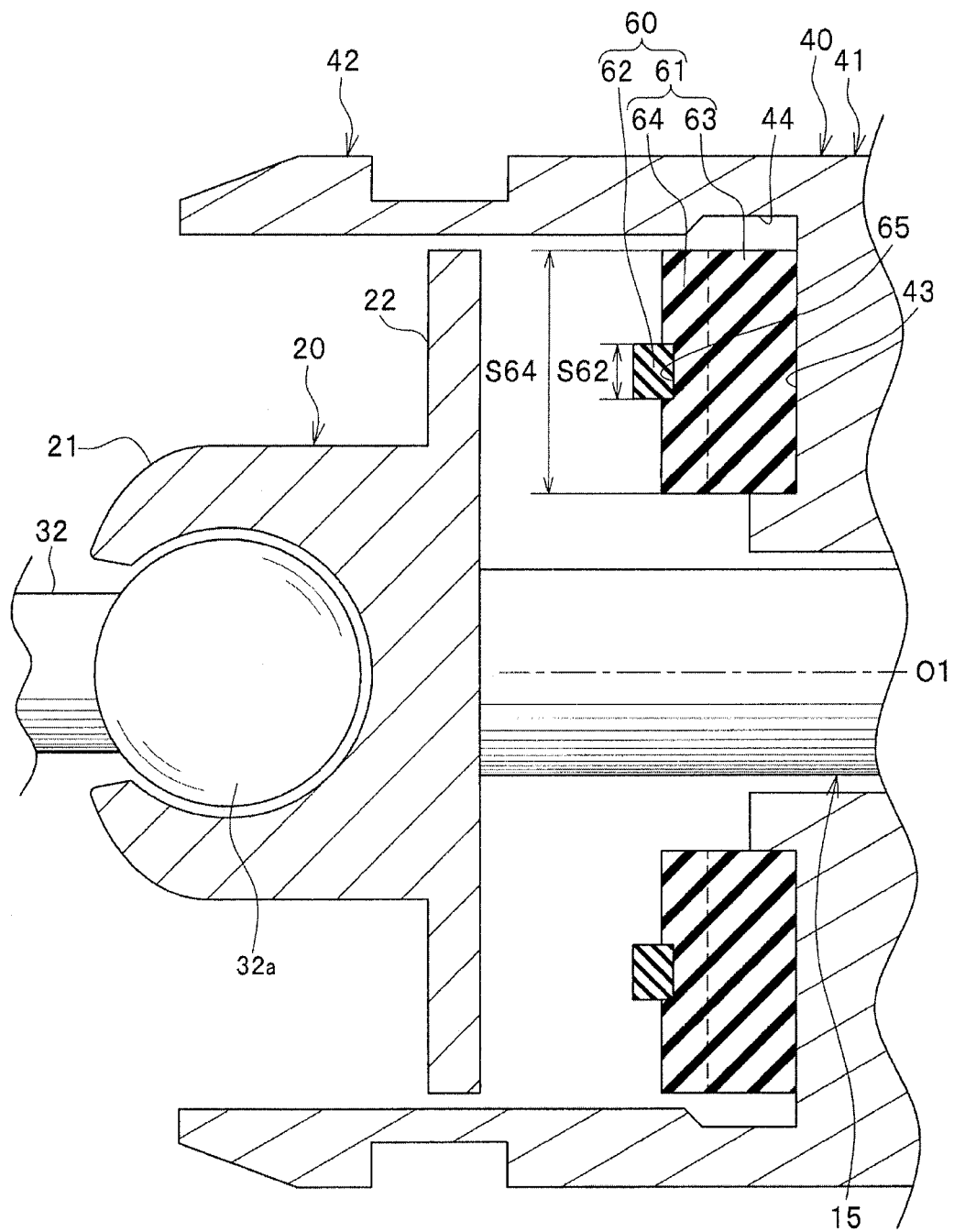
FIG. 8 is an enlarged view of a relevant part of a steering apparatus according to a modification example, showing a neutral state (uncompressed state of a shock absorbing member)

A structure including a shock absorbing member 60 shown in FIG. 8 can be applied. The shock absorbing member 60 includes a high-spring rate member 61 and a low-spring rate member 62 which are separately formed. The low-spring rate member 62 is made of a low-elasticity material (such as rubber) with low elasticity. The high-spring rate member 61 is made of a high-elasticity material (such as resin) with higher elasticity than the low-elasticity material.

The high-spring rate member 61 includes a pedestal portion 63 and a high-spring rate portion 64 formed in an outer side of the pedestal portion 63 in the vehicle width direction. On an outer surface of the high-spring rate portion 64 in the vehicle width direction, a groove 65 is formed, into which the low-spring rate member 62 is inserted. A first pressure receiving area S62 of the low-spring rate member 62 is smaller than a second pressure receiving area S64 of the high-spring rate portion 64.

Figure 9:
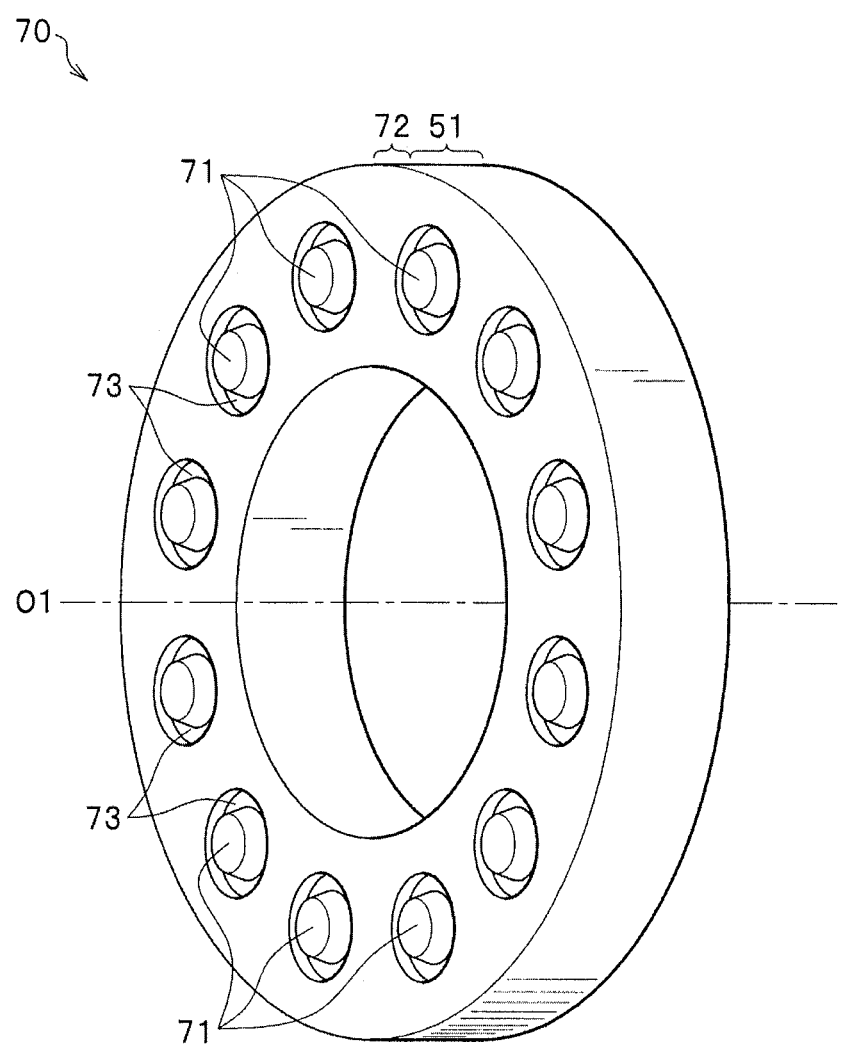
FIG. 9 is a perspective view of a shock absorbing member according to a modification example.

A structure including a shock absorbing member 70 shown in FIG. 9 can be applied. The shock absorbing member 70 is a member integrally formed by one kind of elastic material (rubber or the like), having an annular shape. The shock absorbing member 70 includes a pedestal portion 51, plural low-spring rate portions 71 and a high-spring rate portion 72.

The low-spring rate portions 71 are protrusions having a truncated cone shape protruding from the pedestal portion 51 toward the rack end 20. The plural low-spring rate portions 71 are arranged at equal intervals in a circumferential direction. It is also preferable to apply a structure in which plural lines of low-spring rate portions 71 are arranged in the radial direction.

The high-spring rate portion 72 is a portion protruding from the pedestal portion 51 toward the rack end 20, which is formed so as to surround the low-spring rate portions 71 having the truncated cone shape. In the high-spring rate portion 72, annular grooves 73 are formed around respective low-spring rate portions 71. The grooves 73 are spaces for allowing the low-spring rate portions 71 which will be compressed and deformed to escape.

Plural low-spring rate portions 71 protrude more to the rack end 20 side than the high-spring rate portion 62. Accordingly, after the rack end 20 collides with the low-spring rate portions 71 to compress and deform the low-spring rate portions 71, the rack end 20 collides with the high-spring rate portion 72.

A first pressure receiving area S71 of each of plural low-spring rate portions 71 is smaller than a second pressure receiving area S72 of the high-spring rate portion 72 (S71<S72). Accordingly, the low-spring rate portions 71 and the high-spring rate portion 72 are made of the same material as described above, however, a spring rate of the low-spring rate portions 71 is smaller than a spring rate of the high-spring rate portion 72.

Though the structure of the rack-and-pinion type steering apparatus 1 has been cited as an example in the above embodiment, a ball-nut type apparatus as another type can be applied. When the steering apparatus 1 is the ball-nut type apparatus, a steered shaft moving in the vehicle width direction for steering vehicle wheels is formed by a steered shaft extending in the vehicle width direction.

Though the structure of the steering apparatus 1 in which the steering shaft 12 and the pinion shaft 14 are mechanically connected through the torsion bar 13 has been cited as an example in the above embodiment, it is also possible to apply a steer-by-wire type steering apparatus in which the input device such as the steering wheel 11 is not mechanically connected to the steered shaft.

Though the structure in which the rack ends 20 (stopper) are fixed to the end portions of the rack shaft 15 has been cited as an example in the above embodiment, it is also possible to apply, for example, a structure in which the stopper is fixed to an intermediate part of the rack shaft in the axis direction in addition to the above.

Though the structure in which the shock absorbing member 50 is fixed to the housing 40 has been cited as an example in the above embodiment, it is also possible to apply, for example, a structure in which the shock absorbing member 50 is fixed to the rack end 20 in addition to the above.

What is claimed is:

1. A steering apparatus comprising:
    a steered shaft moving in a vehicle width direction for steering vehicle wheels;
    a first stopper in a moving side, which is provided in the steered shaft and integrally moving with the steered shaft;
    a second stopper in a fixed side, which does not move in the vehicle width direction and controls the movement of the steered shaft by collision from the first stopper to the second stopper; and
    a shock absorbing member provided between the first stopper and the second stopper to absorb a shock from the first stopper to the second stopper,
    wherein the shock absorbing member includes a low-spring rate portion and a high-spring rate portion having a higher spring rate than the low-spring rate portion in the vehicle width direction, and
    the low-spring rate portion and the high-spring rate portion are configured to contact the first stopper.

2. The steering apparatus according to claim 1,
    wherein the low-spring rate portion and the high-spring rate portion are made of the same material, and
    a first pressure receiving area of the low-spring rate portion receiving the shock from the first stopper to the second stopper is smaller than a second pressure receiving area of the high-spring rate portion receiving the shock therefrom.

3. The steering apparatus according to claim 1,
    wherein the low-spring rate portion is made of a low-elasticity material having a low elasticity, and
    the high-spring rate portion is made of a high-elasticity material having a higher elasticity than the low-elasticity material.

4. The steering apparatus according to claim 1,
    wherein the low-spring rate portion protrudes beyond the high-spring rate portion in a direction toward the first stopper in such a manner that the low-spring rate portion contacts the first stopper before the high-spring rate contacts the first stopper.

5. The steering apparatus according to claim 1,
    wherein the low-spring rate portion includes multiple protrusions each of which has a truncated cone shape, and
    the protrusions are arranged at equal intervals in a circumferential direction.

6. The steering apparatus according to claim 1,
    wherein the high-spring rate portion is wider in a radial direction than the low-spring rate portion.

7. The steering apparatus according to claim 1,
    wherein at least one groove is formed between the low-spring rate portion and the high-spring rate portion in a radial direction.

* * * * *